US005457744A

United States Patent [19]
Stone et al.

[11] Patent Number: 5,457,744
[45] Date of Patent: Oct. 10, 1995

[54] TELEPHONE HANG-UP CUP HAVING LATCH MEMBER LOADED BY SPRING

[75] Inventors: Frank H. Stone, Waukegan; allen Wong, Streamwood; John C. Laugal, South Barrington, all of Ill.

[73] Assignee: Motorola, Inc., Schaumburg, Ill.

[21] Appl. No.: 127,930

[22] Filed: Sep. 27, 1993

[51] Int. Cl.⁶ .................................................. H04M 1/00
[52] U.S. Cl. ........................ 379/446; 379/426; 379/455
[58] Field of Search .................................. 379/433, 434, 379/455, 446, 426, 454, 449; 248/221.3

[56] References Cited

U.S. PATENT DOCUMENTS

| | | | |
|---|---|---|---|
| 4,683,585 | 7/1987 | Watkins, Jr. et al. | 379/426 |
| 4,741,034 | 4/1988 | Errichiello et al. | 379/455 |
| 4,897,873 | 1/1990 | Beutler et al. | 379/433 |
| 5,113,436 | 5/1992 | Jarvela et al. | 379/455 |

FOREIGN PATENT DOCUMENTS 42965   2/1989   Japan ...................... 379/434

OTHER PUBLICATIONS

"DYNA T·A·C™ Cellular Mobile Telephone, Model, T19ATA8822AE", Instruction Manual, mechanical parts drawing, Motorola, Inc., Aug. 31, 1983.
Irving, Donald E., "Handset Latch & Delatch System", Motorola Technical Developments, vol. 3, Mar. 1983, pp. 8–9.

Primary Examiner—Jeffery A. Hofsass
Assistant Examiner—Jack Chiang
Attorney, Agent, or Firm—Daniel W. Juffernbruch

[57] ABSTRACT

A hang-up cup for a telephone handset is provided having a hang-up cup housing (100) capable of accepting a portion of the telephone handset. A latch member (120) is hinged to the hang-up cup housing (100) by axial prongs (210) of the latch member (120) and curved prong (220) of the hang-up cup housing (100). A straight spring (230) is secured between spring retaining grooves (240) of the latch member (120) and wire support members (250) latch stops (270) are provided to restrict rotation of the latch member (120) about the hinge and prevents separation of the prongs (210, 220) upon excess rotation of the latch member (120) with respect to the hang-up cup housing (100).

7 Claims, 4 Drawing Sheets

FIG.1 —PRIOR ART—

TELEPHONE HANG-UP CUP HAVING LATCH MEMBER LOADED BY SPRING

BACKGROUND OF THE INVENTION

1. Technical Field of the Invention

The present invention relates to a telephone hang-up cup having a latch member and, more particularly, relates to a telephone hang-up cup having a latch member loaded by a straight spring.

2. Description of the Related Art

FIG. 1 illustrates a typical telephone handset 5 held in place by a hang-up cup 10. Previous hang-up cups for telephone handsets contained many parts. Not only were each of these parts expensive to machine, but the parts were also expensive to assemble because of the multiple assembly steps necessary.

For example, the "DYNA T.A.C™ Cellular Mobile Telephone, Model T19ATA8822AE," Instruction Manual, Motorola, Inc., Aug. 31, 1983 discloses a hang-up cup having a latch mechanism. The latch mechanism requires at least four screws, a machine bracket, a spacer, at least three arms, a guide, and a torsion spring. Each of these parts requires careful machining. Assembly of these many parts also requires much time and skill. U.S. Pat. No. 5,133,436 issued to Jarvela et al. discloses a telephone hang-up cup requiring many parts. Two screws are used to attach a latch support bracket encasing a torsional spring, two slidable plate members, a latch member, magnet, and adhesive pad. Each of these parts is expensive to manufacture and assemble. U.S. Pat. No. 4,741,034 issued to Errichiello et al. and Motorola Technical Developments, Volume 3, March 1983, pages 8 and 9 disclose other hang-up cup arrangements requiring torsion springs, levers and arms which are expensive to manufacture and assemble.

U.S. patent application Ser. No. 08/023,996 filed Mar. 1, 1993 to Jeffrey F. Kurgan, Paul J. Kudrna and Frank Annerino, and entitled "Telephonic Support Receptacle and Method Therefor", discloses a hang-up cup for telephone handset. Two bar members having rack-type gear teeth, a spur gear having pinion-type teeth and a screw are used to operate a latch member connected to an end of each bar member.

FIG. 2 illustrates a previous hang-up cup having a smaller number of parts. A latch member 20 was held in place by a piece of punched and formed spring metal 30. The spring metal 30 served to apply a bias on the latch member 20. Two screws 35 were used to fasten the spring metal to a housing of the hang-up cup.

FIG. 3 illustrates another previous hang-up cup having two springs 32 and 34 and two buttons 15 and 16. When the two buttons 15 and 16 are pressed, screw 22 moves outward along a slot 19 in bar members 17 and 18. The outward movement of screw 22 causes outward movement of a latch member against an inward force applied against the latch member by the spring 32. The other spring 34 is hooked into holes in the ends of the bar members 17 and 18. The spring 34 applies a force against the bar members 17 and 18, also causing an inward bias against the latch member via the screw 22. These assemblies, however, were also difficult to manufacture and assemble.

SUMMARY OF INVENTION

The present invention solves these and other problems by providing a hang-up cup and method of assembly thereof. A straight spring is secured between a housing of the hang-up cup and a latch member. According to the different embodiments, this three-piece assembly can be easily assembled by pressing the straight spring between a latch member and the hang-up cup housing. The straight spring is easy to manufacture because it can be cut from a piece of wire. The latch member and hang-up housing are also easy to manufacture because they can be molded without difficult tooling operations. The hang-up cup housing and latch member can additionally be easily hinged together by axial and curved prongs which are slidably assembled.

These and other constructions and features of the present invention will become more apparent from the following detailed description when read in conjunction with the accompanying drawings.

DETAILED DESCRIPTION OF THE DRAWINGS

DETAILED DESCRIPTION OF THE PREFERRED EMBODIMENTS

Figure 1:
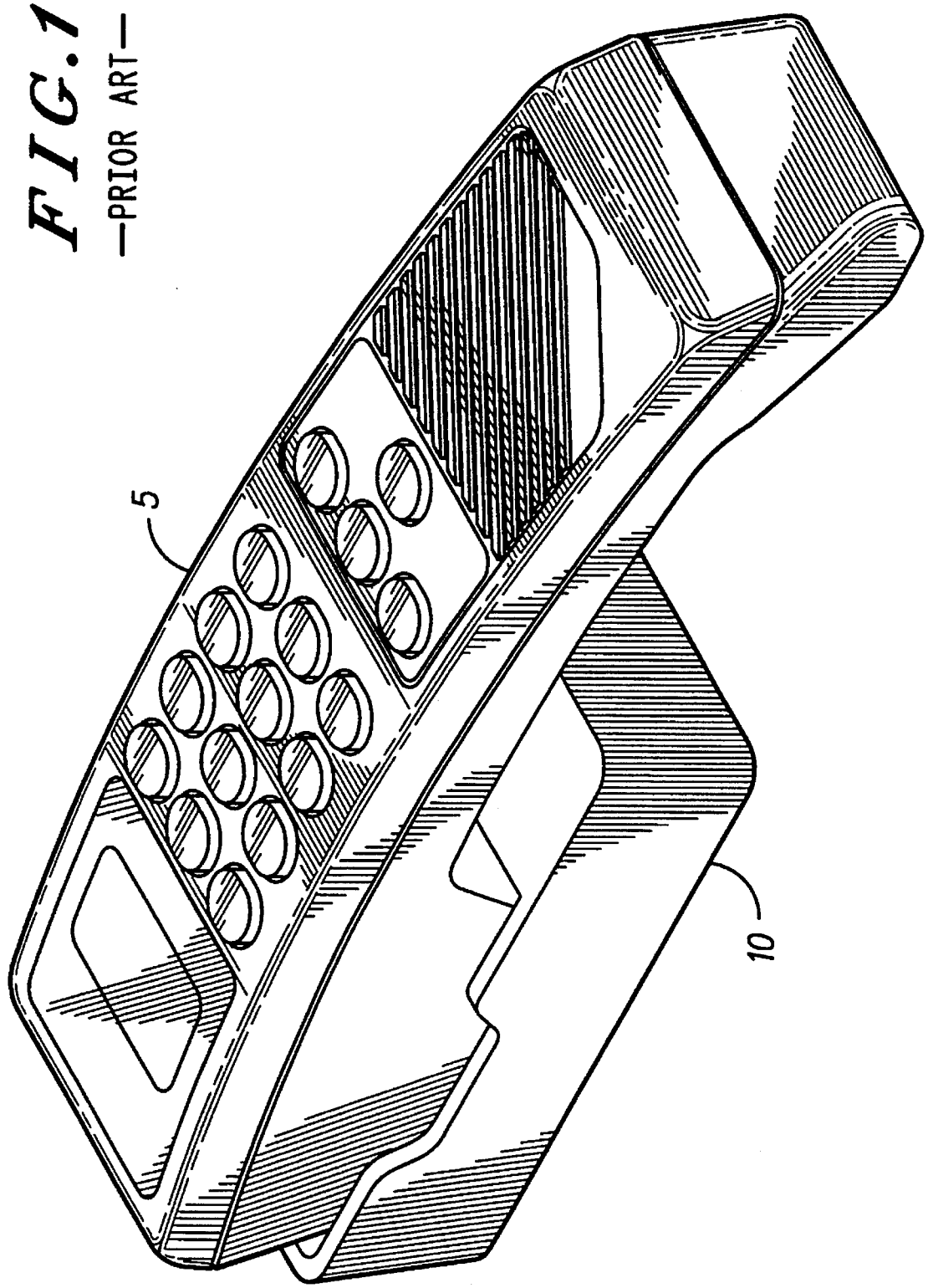
FIG. 1 illustrates a view of the hang-up cup holding a telephone handset.
Figure 2:
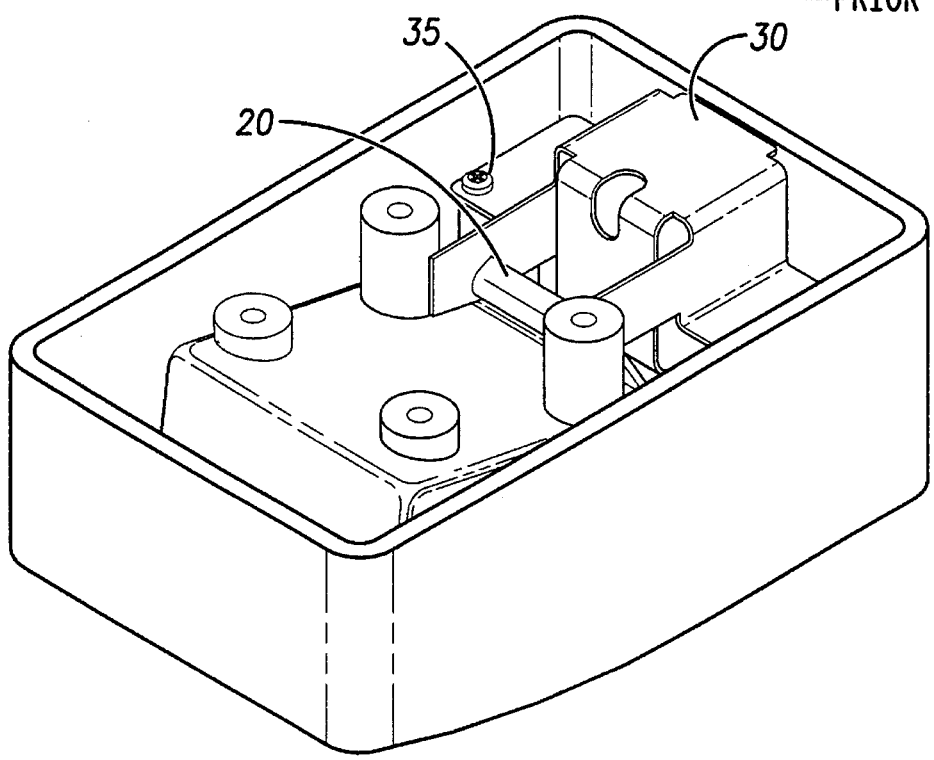
FIGS. 2 and 3 illustrate views of previous hang-up cups.
Figure 3:
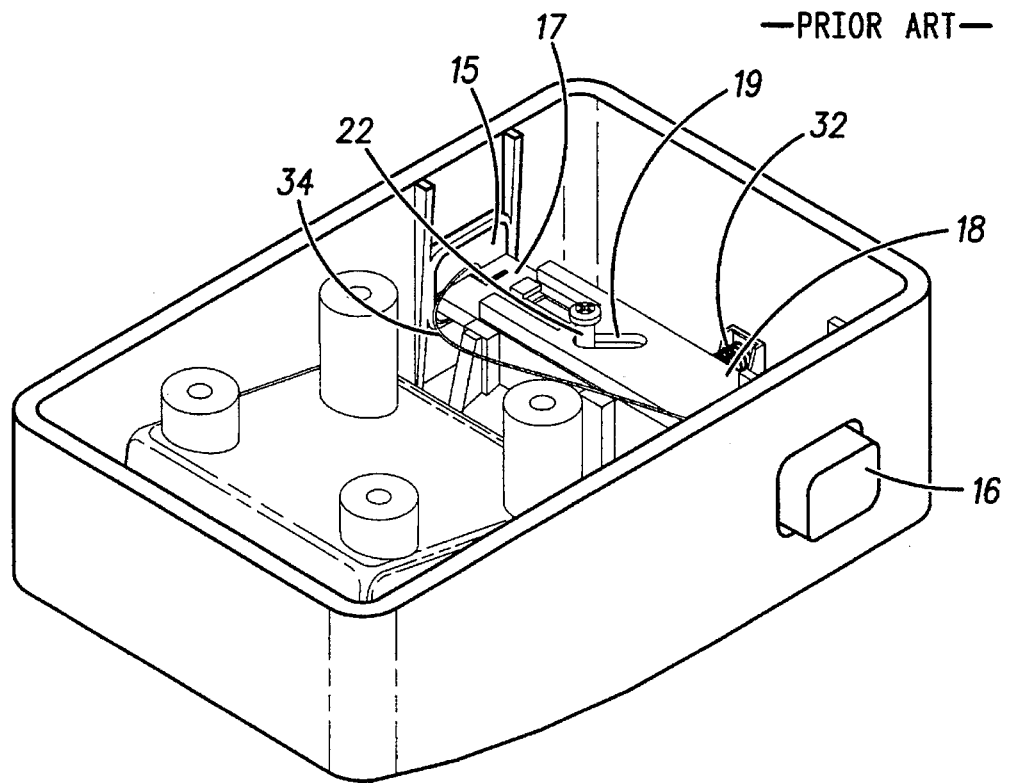
Figure 4:
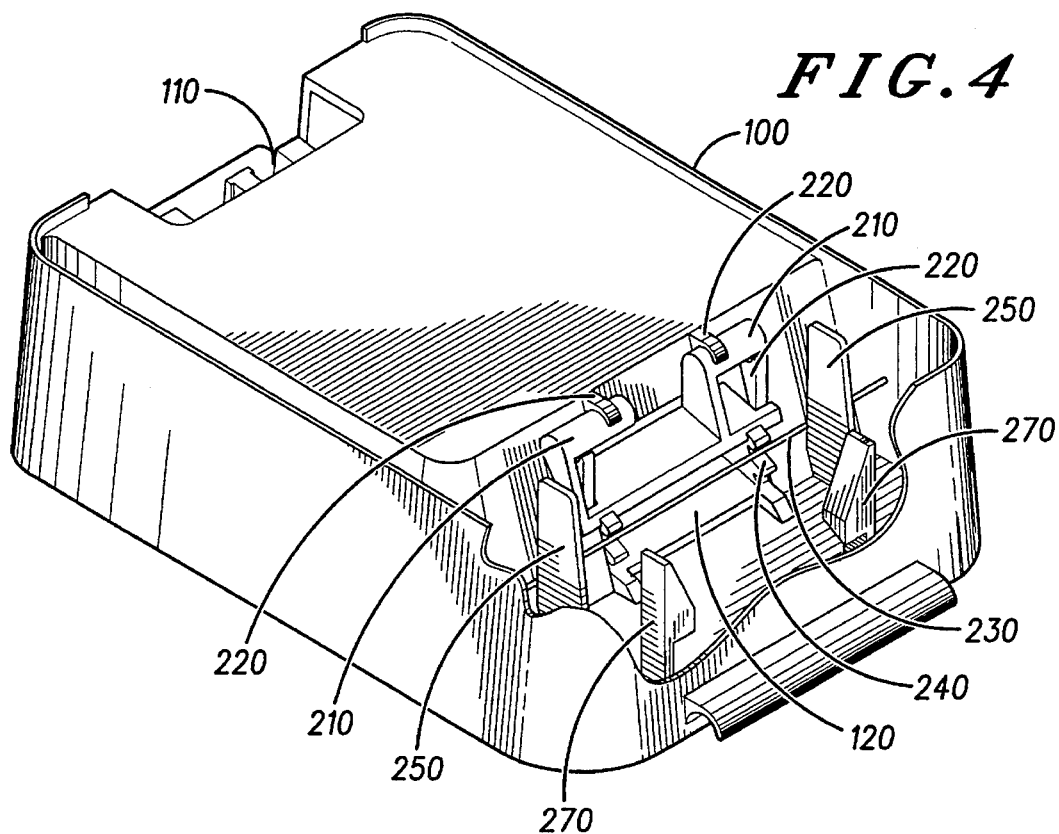
FIG. 4 illustrates a view of the underside of the hang-up cup according to the present invention.

FIG. 4 illustrates a view of an underside of the hang-up cup according to the present invention. A telephone handset is held in place by a fixed latch member 110 of the telephone cup which mates with an indentation in an upper portion of the telephone handset 5. The telephone handset 5 is also held to the hang-up cup 100 by a retractable latch member 120 which mates with an indentation in the telephone handset associated therewith. FIG. 4 illustrates an example of a hang-up cup 100 which accepts the ear piece portion of the telephone handset. However, FIG. 2 is by example only and other hang-up cups are possible which connect to portions of the telephone handset other than the ear piece portion.

A latch member 120 connects to the hang-up cup housing 100 by a hinged formed of axial prongs 210 and curved prongs 220. A straight spring 230 is held between spring retaining grooves 240 of the latch member 120 and spring support members 250 of the hang-up cup housing 100. The straight spring 230 biases the latch member 120 towards an opening 260 in the hang-up cup housing 100.

The straight spring 230 is formed of a hardened spring type material such as music wire. A predetermined length of music wire can be cut to form the straight spring 230 of the present invention. No further tooling of the spring such as bending hooks in the ends or coiling into a torsional shape is necessary. The hardened spring type material need not be a round wire. Flat springs such as those used in leaf springs may also be implemented for the straight spring 230 of the present invention.

The hang-up cup housing 100 also contains latch stops 270 integrally formed in the hang-up cup housing 100. The latch stops 270 are used during assembly to restrict rotation of the latch member 120 with respect to the hang-up cup housing 100. When the latch member 120 rotates in a extreme direction with respect to the hang-up cup housing 100, the axial prongs 210 will separate from the curved prongs 220 disconnecting the latch member 120 from the hang-up cup housing 100 and separating the hinge formed there between.

Figure 5:
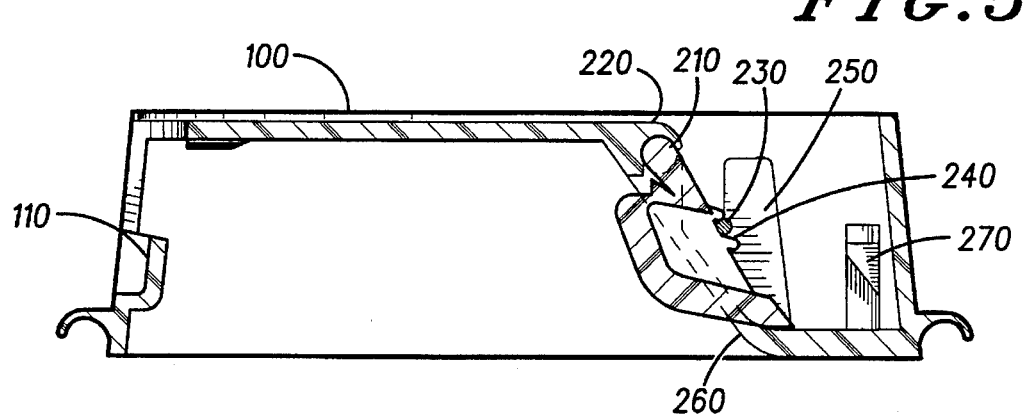
FIG. 5 illustrates a side view of the hang-up cup according to the present invention.

FIG. 5 shows a sectional side view of FIG. 4. FIG. 5 illustrates how the axial prong 210 of the latch member 120 coupled with the curved prongs 220 of the hang-up cup 100. By providing pairs of curved prongs 220 for coupling with each of the axial prongs 210, tooling of the hang-up cup housing 100 is simplified. The hang-up cup housing 100 can be manufactured using a molding process without the need to machine holes in the housing for coupling to the axial prong 210. Each axial prong 210 has a sufficient length to mate with a pair of upper and lower curved prongs 220. So long as the latch member 120 is appropriately positioned with a sufficient angle in the opening 260 of the hang-up cup housing 100, the axial prong 210 will remain held between the curved prongs 220. The straight spring 230 biases the latch member 120 toward the opening 260 and thus holds the axial prongs 210 in the in position between the curved prongs 220.

During assembly, before the straight spring 230 is installed, the latch stops 270 prevent the latch member 120 from rotating about the hinge out of the opening 260. If the latch member 120 rotates to an extreme position out of the opening 260, the axial prongs 210 will become disengaged from the curved prongs 220.

After the latch member 120 is secured by the latch stops 270 so that the axial prongs 210 will remain between the curved prongs 220, the straight spring 230 can be positioned between the spring retaining grooves 240 and the wire support members 250. The straight spring 230 can easily be snapped in place between the spring retaining grooves 240 and the latch stops 250 by the simple downward pressing motion of the spring to the bottom of the groove formed between the latch member 120 and the wire support members 250.

Figure 6:
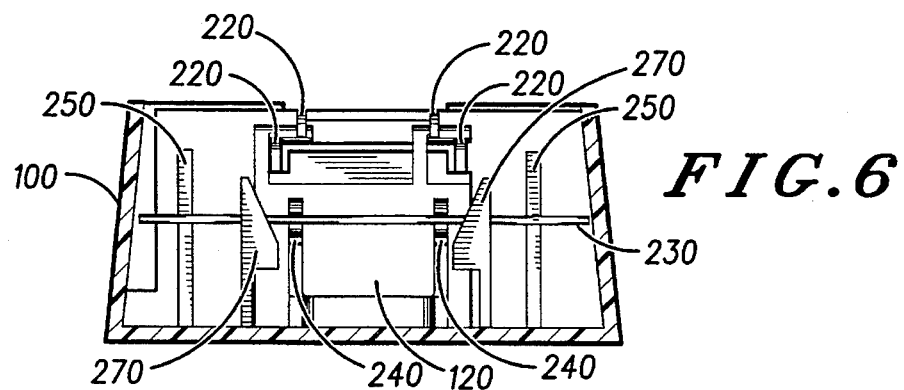
FIG. 6 illustrates a end view of the hang-up cup according to the present invention.

FIG. 6 illustrates a sectional end view of FIG. 4. The straight spring 230 is illustrated between the latch member 120 and the wire support members 250. Wire retaining grooves 240 are illustrated on the latch member 120 for holding the straight spring 230. Latch stops 270 are illustrated having teeth 280 for allowing the latch member 120 to be latched by the latch stops 280.

Axial prongs 210 of the latch member 120 are axially slid between the curved prongs 220 of the hang-up cup housing 100 to form the hinge there between. The latch member 120 is then downwardly pivoted about the hinge and locked in place below the teeth 280 of the latch stops 270. In this secured position, the straight spring 230 can then be easily snapped in place.

Figure 7:
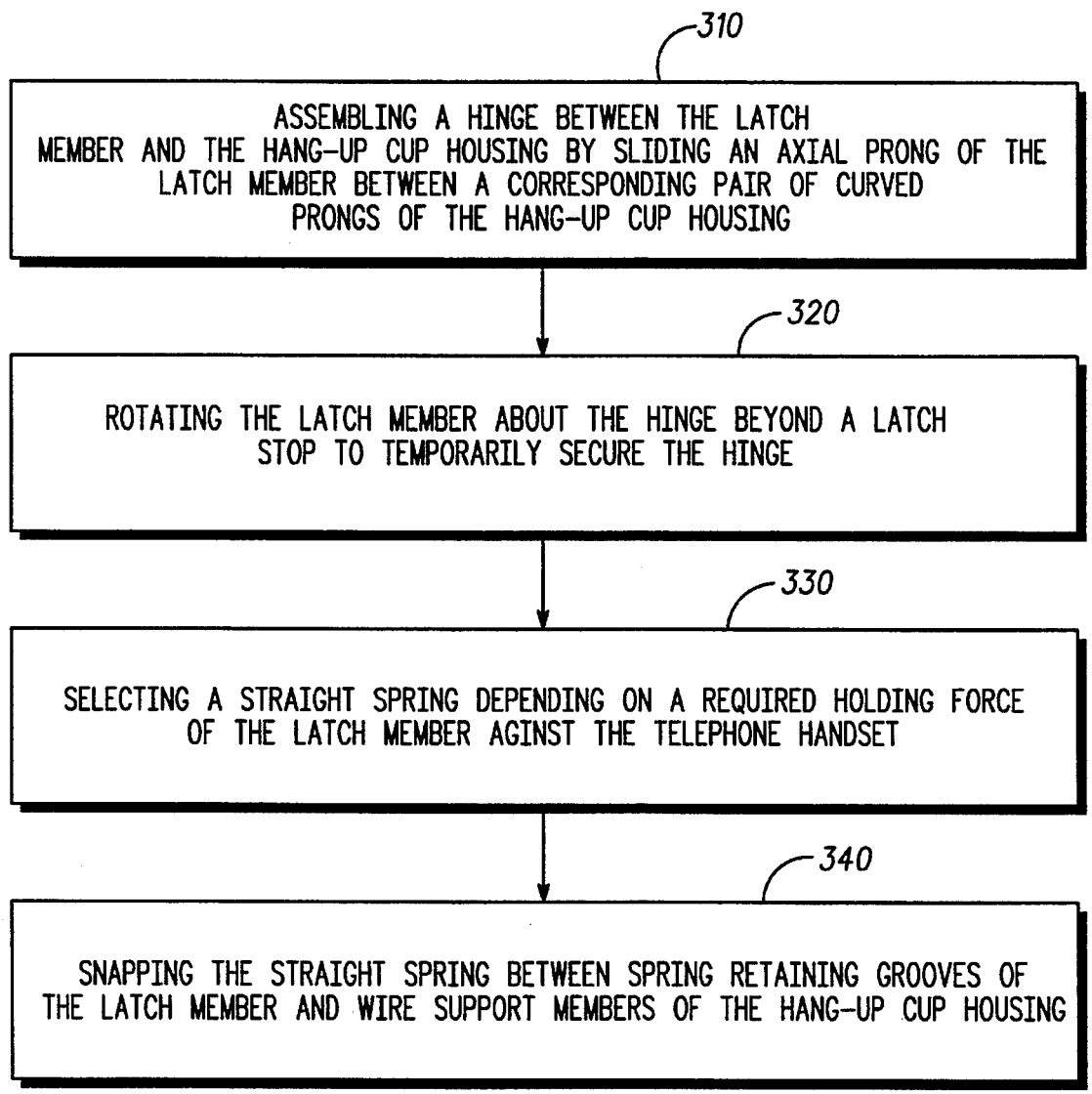
FIG. 7 is a flow chart illustrating the method of assembly according to the present invention.

FIG. 7 illustrates a flow chart of the method of assembly according to the present invention. The hinge between the latch member 120 and the hang-up cup housing 100 is assembled in step 310. The hinge is assembled by sliding the axial prongs 210 of the latch member 120 between corresponding pairs of upper and lower curved prongs 220 of the hang-up cup housing 100. Because the upper and lower curved prongs 220 are integrally formed in the hang-up cup housing 100, the hang-up cup housing 100 can be easily manufactured by an injection mold process. No machining of the hang-up cup housing 100 is necessary. For example, machining by drilling a hole to receive the axial portion of a hinge is unnecessary.

Thereafter, the latch member is rotated in step 320 about the hinge in step 320 beyond the latch stops 270. The latch stops 270 temporarily secure the hinge during assembly. If the hinge is not secured during assembly, it could rotate back in the extreme position. In the extreme position, the hinge may become disassembled because the axial prongs 210 could fall out of the curved prongs 220 in such an extreme position.

Then, after step 320, a straight spring is selected depending on a required holding forced of the latch member against the telephone handset. Different holding forces of the latch member against the telephone handset are necessary for various applications. For example, for passenger safety, the United States government encourages a holding force of at least twenty times the force of gravity for a hang-up cup installed in an automobile. However, if the hang-up cup is used in a bag-style carry cellular telephone, a force of twenty times gravity would cause the entire bag to be lifted up before the telephone handset would be released from the hang-up cup housing. Thus, a straight spring of a different force can be selected for a such a different application. The present invention simplifies the design and manufacture process because the same design can be used for all applications and the required force simply changed by selecting a spring having a different tension.

After step 330, the straight spring 230 is snapped between the spring retaining grooves 240 of the latch member 120 and the wire support members 250 of the hang-up cup housing 100 in step 340 as illustrated in FIG. 5. The straight spring 230 can easily be installed between the latch member 120 and the latch support members 250. The wire spring 230 can be snapped in place without accurate positioning because the straight string travels along a V-shaped guide formed by the latch member 120 and the wire support members 250. The process for snapping the straight spring 230 there between can quickly be performed by a human finger or easily performed by mechanical machinery.

Although the invention has been described and illustrated in the above description and drawings, it is understood that this description is by example only and that numerous changes and modifications can be made by those skilled in the art without departing from the true spirit and scope of the invention.

What is claimed is:

1. A hang-up cup for a telephone handset, comprising:

a hang-up cup housing for accepting a portion of the telephone handset;

a latch member hinged to said hang-up cup housing upon an axis;

a support member integrally formed with the hang-up cup;

a groove formed in one of said latch member and said support member; and a straight wire spring fixedly secured in said groove in a direction parallel to the axis between said latch member and said support member.

2. A hang-up cup according to claim 1, wherein said hang-up cup housing and said latch member comprise prongs integrally formed therein, said prongs rotationally connected to form a hinge.

3. A hang-up cup according to claim 1, wherein said hang-up cup housing and said latch member comprise curved and axial prongs rotationally connectable to form a hinge.

4. A hang-up cup according to claim 3, wherein at least two curved prongs cooperate with each said axial prong.

5. A hang-up cup according to claim 3, wherein said hang-up cup housing comprises said curved prongs; and wherein said latch member comprises said axial prongs.

6. A hang-up cup according to claim 2, wherein said hang-up cup housing comprises at least one latch stop positioned to restrict rotation of said latch member about the hinge to prevent separation of said prongs upon excess rotation thereof.

7. A hang-up cup according to claim 1, wherein said straight spring is fixedly secured with a bias between said latch member and said hang-up cup housing.

* * * * *